(12) United States Patent
Li et al.

(10) Patent No.: US 12,557,019 B2
(45) Date of Patent: Feb. 17, 2026

(54) POWER SAVING MODE SWITCHING METHOD, TERMINAL, AND NETWORK SIDE DEVICE

(71) Applicant: VIVO MOBILE COMMUNICATION CO., LTD., Dongguan (CN)

(72) Inventors: Dongru Li, Dongguan (CN); Xueming Pan, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 557 days.

(21) Appl. No.: 17/969,659

(22) Filed: Oct. 19, 2022

(65) Prior Publication Data
US 2023/0046439 A1 Feb. 16, 2023

Related U.S. Application Data

(63) Continuation of application No. PCT/CN2021/087734, filed on Apr. 16, 2021.

(30) Foreign Application Priority Data

Apr. 22, 2020 (CN) .......................... 202010324336.9

(51) Int. Cl.
*H04W 52/02* (2009.01)
*H04W 76/28* (2018.01)

(52) U.S. Cl.
CPC ....... *H04W 52/0235* (2013.01); *H04W 76/28* (2018.02)

(58) Field of Classification Search
CPC . H04W 52/0235; H04W 76/28; H04W 52/02; H04W 52/0212; Y02D 30/70; H04L 5/0098; H04L 1/1896
See application file for complete search history.

(56) References Cited

U.S. PATENT DOCUMENTS

| 2019/0149380 | A1 | 5/2019 | Babaei et al. |
| 2019/0254110 | A1 | 8/2019 | He et al. |
| 2021/0320778 | A1* | 10/2021 | Hsieh .................... H04L 1/1819 |
| 2022/0394616 | A1* | 12/2022 | Maleki ............. H04W 52/0216 |

(Continued)

FOREIGN PATENT DOCUMENTS

| CN | 109983822 A | 7/2019 |
| CN | 110913467 A | 3/2020 |
| CN | 111417135 A | 7/2020 |

(Continued)

OTHER PUBLICATIONS

3GPP TSG RAN WG1 Meeting #98bis; R1-1910076; Source: Huawei, HiSilicon; Title: PDCCH-based power saving signal/channel; Chongqing, China, Oct. 14-20, 2019. (Year: 2019).*

(Continued)

*Primary Examiner* — Mohammed S Chowdhury
(74) *Attorney, Agent, or Firm* — IPX PLLC

(57) ABSTRACT

A power saving mode switching method, a terminal, and a network side device are provided. The power saving mode switching method, which may be performed by the terminal, includes: perform a switching operation at a first moment before on duration of a DRX cycle, where the switching operation is used to switch a first cell of the terminal to a target power saving mode.

20 Claims, 5 Drawing Sheets

(56) References Cited

U.S. PATENT DOCUMENTS

2023/0024064 A1* 1/2023 Tie .................... H04W 52/0235
2023/0104198 A1* 4/2023 Maleki ................. H04L 5/0053
                                                             370/329

FOREIGN PATENT DOCUMENTS

CN         112399571 A      2/2021
WO       2020020277 A1      1/2020

OTHER PUBLICATIONS

3GPP TSG RAN WG1 Meeting #98bis; R1-19xxxxx; Source: CATT; Title: Offline Discussion Summary of PDCCH-based Power Saving Signal/Channel; Chongqing, China, 14-20, 2019. (Year: 2019).*
3GPP TS 38.133 V15.9.0 (Mar. 2020); (Year: 2020).*
62933155-SPEC_Nov. 8, 2019 (U.S. Appl. No. 62/933,155 Nov. 8, 2019) (Year: 2019).*
International Search Report issued in corresponding International Application No. PCT/CN2021/087734, mailed Jul. 29, 2021, 6 pages.
Vivo, Remaining aspects of PDCCH-based power saving signal, 3GPP TSG RAN WG1 #98bis, R1-1910233, Oct. 4, 2019, 14 pages.
First Office Action issued in related Chinese Application No. 202010324336.9 mailed Mar. 1, 2022, 9 pages.
CMCC, Discussion on UE power saving schemes with adaption to UE traffic, 3GPP TSG RAN WG1 #96, R1-1903344, Feb. 22, 2019, 14 pages.
Vivo, Power saving for BWP/SCell operation in RRC_Connected, 3GPP TSG-RAN WG2 Meeting #106, R2-1905957, May 3, 2019, 7 pages.
Institute for Information Industry (III), The impact of BWP configuration and switching, 3GPP TSG-RAN WG2 NR Ad hoc 1801, R2-1800778, Jan. 12, 2018, 5 pages.
Huawei, etc. Remaining aspects of PDCCH-based power saving signal, 3GPP TSG RAN WG1 #98bis, R1-1910233, Oct. 3, 2019.

* cited by examiner

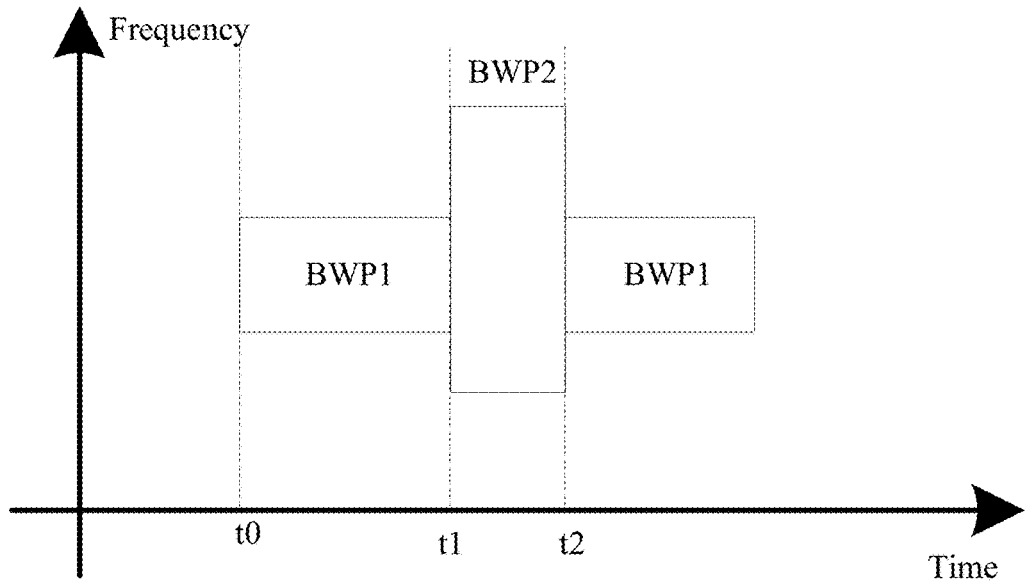
FIG. 1
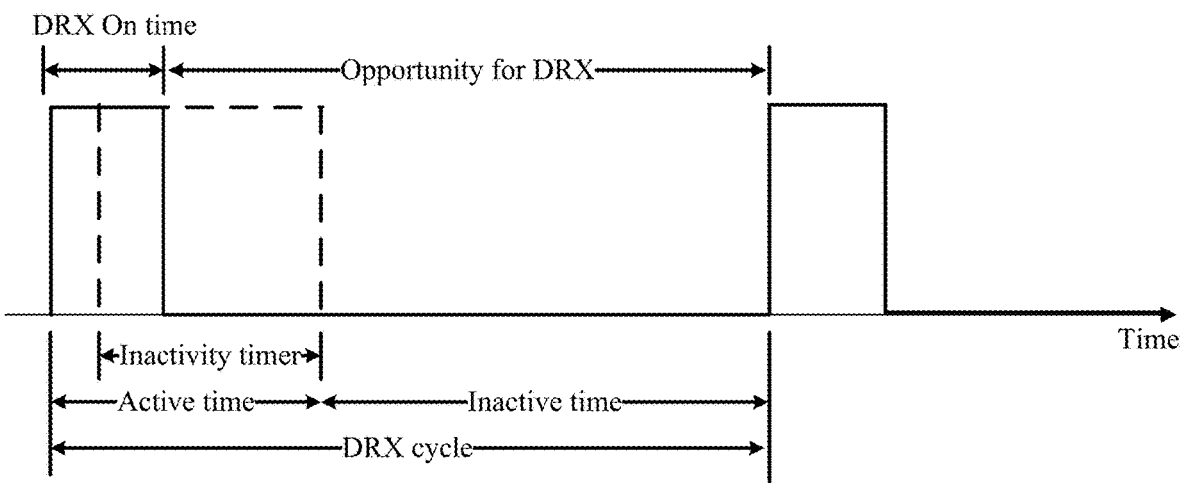
FIG. 2
Perform a switching operation at a first moment before on duration of a DRX cycle, where the switching operation is used to switch a first cell of a terminal to a target power saving mode ⎯ 301
FIG. 3

Send first indication information to a terminal, where the first indication information is used to instruct the terminal to perform a switching operation at a first moment before on duration of a DRX cycle, and the switching operation is used to switch a first cell of the terminal to a target power saving mode — 501

POWER SAVING MODE SWITCHING METHOD, TERMINAL, AND NETWORK SIDE DEVICE

CROSS-REFERENCE TO RELATED APPLICATIONS

This application is a continuation of International Application No. PCT/CN2021/087734, filed on Apr. 16, 2021, which claims priority to Chinese Patent Application No. 202010324336.9, filed on Apr. 22, 2020. The entire contents of each of the above-identified applications are expressly incorporated herein by reference.

TECHNICAL FIELD

Embodiments of the present disclosure relate to the field of communications technologies, and in particular, to a power saving mode switching method, a terminal, and a network side device.

BACKGROUND

For a periodic service, when a network configures Discontinuous Reception (DRX) for a terminal (also referred to as User Equipment (UE)), the UE switches, by receiving scheduling Downlink Control Information (DCI), a current active BandWidth Part (BWP) to a high-bandwidth BWP that can efficiently transmit data, to complete data transmission. However, due to a BWP switch delay and an interruption that are caused by BWP switching, a data transmission delay and power consumption are increased.

SUMMARY

Embodiments of the present disclosure provide a power saving mode switching method, a terminal, and a network side device.

According to a first aspect, an embodiment of the present disclosure provides a power saving mode switching method, where the method is applied to a terminal and includes:

performing a switching operation at a first moment before on duration of a DRX cycle, where the switching operation is used to switch a first cell of the terminal to a target power saving mode.

According to a second aspect, an embodiment of the present disclosure provides a power saving mode switching method, where the method is applied to a network side device and includes:

sending first indication information to a terminal, where the first indication information is used to instruct the terminal to perform a switching operation at a first moment before on duration of a DRX cycle, and the switching operation is used to switch a first cell of the terminal to a target power saving mode.

According to a third aspect, an embodiment of the present disclosure further provides a terminal, and the terminal includes:

an operation module, configured to perform a switching operation at a first moment before on duration of a DRX cycle, where the switching operation is used to switch a first cell of the terminal to a target power saving mode.

According to a fourth aspect, an embodiment of the present disclosure further provides a network side device, and the network side device includes:

a first sending module, configured to send first indication information to a terminal, where the first indication information is used to instruct the terminal to perform a switching operation at a first moment before on duration of a DRX cycle, and the switching operation is used to switch a first cell of the terminal to a target power saving mode.

According to a fifth aspect, an embodiment of the present disclosure further provides a terminal. The terminal includes a processor, a memory, and a program that is stored in the memory and that can run on the processor, and when the program is executed by the processor, steps in the power saving mode switching method are implemented.

According to a sixth aspect, an embodiment of the present disclosure further provides a network side device. The network side device includes a processor, a memory, and a program that is stored in the memory and that can run on the processor, and when the program is executed by the processor, steps in the power saving mode switching method are implemented.

According to a seventh aspect, an embodiment of the present disclosure further provides a readable storage medium. The readable storage medium stores a program or an instruction, and when the program or the instruction is executed by a processor, steps in the power saving mode switching method applied to the terminal or the network side device are implemented.

BRIEF DESCRIPTION OF DRAWINGS

The following briefly describes the accompanying drawings for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a first schematic diagram of BWP switching according to an embodiment of the present disclosure;

FIG. 2 is a schematic diagram of a DRX cycle according to an embodiment of the present disclosure;

FIG. 3 is a first flowchart of a power saving mode switching method according to an embodiment of the present disclosure;

DETAILED DESCRIPTION

Figures 4, 5:
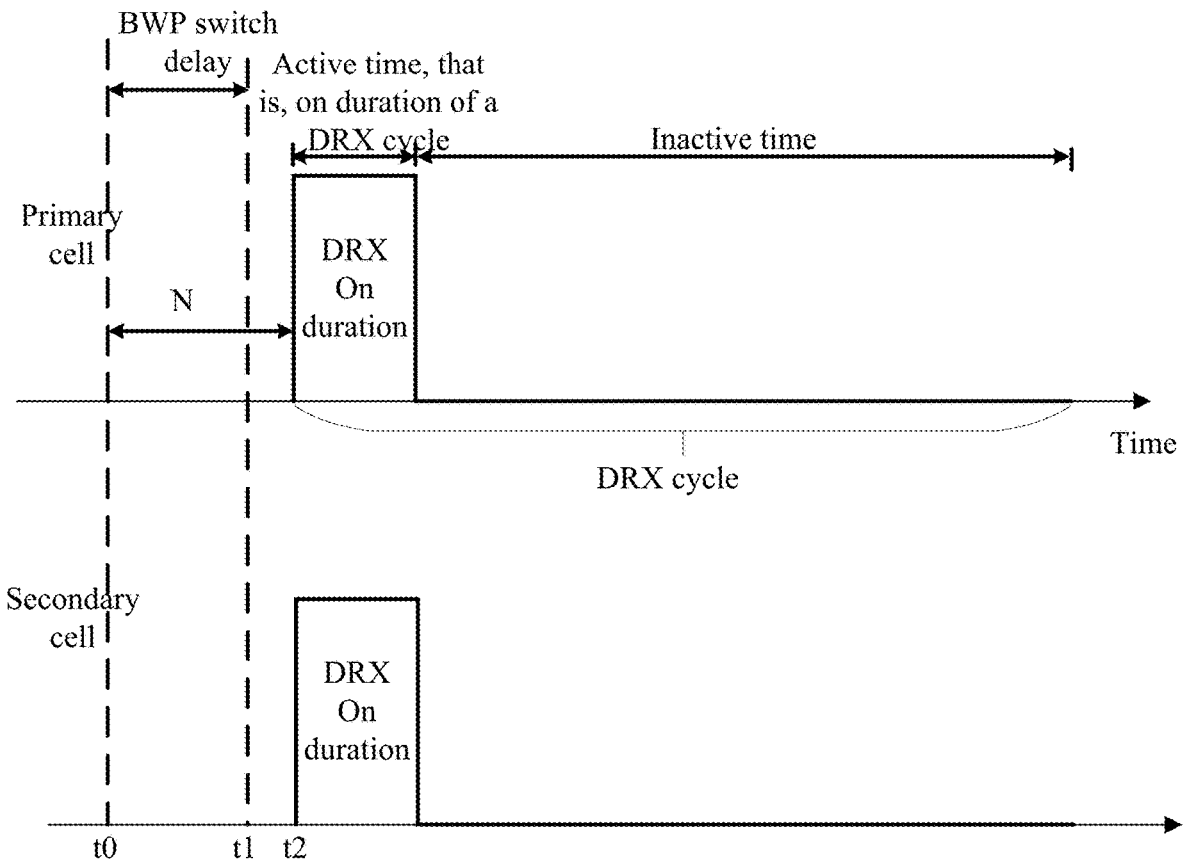
FIG. 4 is a second schematic diagram of BWP switching according to an embodiment of the present disclosure.
FIG. 5 is a second flowchart of a power saving mode switching method according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

Terms "first" and "second" in the embodiments of the present disclosure are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices.

For ease of understanding, some content related to the embodiments of the present disclosure is described below.

1. BandWidth Part (BWP) Switching.

(1) Methods for implementing BWP switching may be but are not limited to the following several methods:

indicating BWP switching by using Downlink Control Information (DCI) in a Physical Downlink Control CHannel (PDCCH);

using a BWP-related timer (such as bwp-InactivityTimer) to implement BWP switching (after the timer expires, switching to a default BWP);

activating or deactivating a BWP by using a Radio Resource Control (RRC) message; and controlling BWP switching by using a random access process.

For ease of understanding, switching between BWP1 and BWP2 is used as an example for description. Reference is made to FIG. 1. In FIG. 1, BWP1 is in an active state between t0 and t1, BWP2 is in an active state between t1 and t2, and BWP1 is in an active state between t2 and t3. Therefore, a terminal (also referred to as User Equipment (UE)) switches an active BWP at t1 and t2, switches from BWP1 to BWP2 at t1, and switches from BWP1 to BWP2 at t2. In specific implementation, the terminal may implement BWP switching in any one of the foregoing switching manners.

(2) BWP Switch Delay $T_{BWPswitchDelay}$.

TABLE 1

| | $T_{BWPswitchDelay}$ | |
|---|---|---|
| New radio slot length | $T_{BWPswitchDelay}$ (slot) | |
| μ (milliseconds) | BWP switching type 1 | BWP switching type 2 |
| 0 | 1 | 1 | 3 |
| 1 | 0.5 | 2 | 5 |
| 2 | 0.25 | 3 | 9 |
| 3 | 0.125 | 6 | 18 |

For $T_{BWPswitchDelay}$, reference may be made to Table 1. As shown in Table 1, $T_{BWPswitchDelay}$ is related to μ, a New Radio (NR) slot length, and a BWP switching type. μ is the smallest SCS between SubCarrier Space (SCS) configuration of a Physical Downlink Control CHannel (PDCCH) providing DCI and SCS configuration of a Physical Uplink Control CHannel (PUCCH) with Hybrid Automatic Repeat reQuest ACKnowledgement (HARQ-ACK) information in response to the detection of the DCI (the smallest SCS configuration between the SCS configuration of the PDCCH providing the DCI and the SCS configuration of a PUCCH with the HARQ-ACK information in response to the detection of the DCI).

It should be noted that, for the BWP switching type 1 in Table 1, $T_{BWPswitchDelay}$ depends on a terminal capability (UE capability) ($T_{BWPswitchDelay}$ depends on UE capability). For the BWP switching type 2 in Table 1, if BWP switching involves changing of SCS, the BWP switch delay is determined by the larger one between the SCS before BWP switch and the SCS after BWP switch (If the BWP switch involves changing of SCS, the BWP switch delay is determined by the larger one between the SCS before BWP switch and the SCS after BWP switch).

2. Radio Resource Control (RRC) Discontinuous Reception (DRX).

A typical DRX cycle is shown in FIG. 2. As shown in FIG. 2, one DRX cycle may consist of DRX On Duration and an Opportunity for DRX. In the time of On Duration, the UE monitors and receives a PDCCH; and in the time of Opportunity for DRX, the UE does not monitor the PDCCH, to reduce power consumption.

If a newly transmitted PDCCH is received in On Duration, the terminal starts or restarts a DRX inactivity timer to prolong duration in which the UE monitors the PDCCH.

It should be noted that, both the DRX on duration and the inactivity timer started due to the newly transmitted PDCCH are active time, and the opportunity for DRX is outside active time. In addition, the active time may be prolonged when being triggered due to other reasons.

If the terminal starts or restarts the inactivity timer in a DRX cycle, active time of the DRX cycle is greater than on duration of the DRX cycle. In some embodiments, the active time of the cycle includes on duration in the DRX cycle and time in which the inactivity timer is in a running state.

If the terminal does not start or restart the inactivity timer in a DRX cycle, active time of the DRX cycle is equal to on duration of the DRX cycle. For details, reference is made to FIG. 2.

3. DCI Format 2_6 Scrambled by a Power-Saving Radio Network Temporary Identifier (DCP).

The DCP is fully referred to as a DCI format 2_6 (DCI format 2_6 with CRC scrambled by PS-RNTI) scrambled by a Power Saving-Radio Network Temporary Identifier (PS-RNTI).

To further save power in DRX configuration, a network may further configure a DCP for the UE when a DRX mechanism is configured. A wake up indication field in the DCP is used to indicate whether the UE enables a next DRX cycle on duration timer or whether the DCP indicates whether a Medium Access Control (MAC) layer enables a next DRX cycle on duration timer. Starting the on duration timer means that the UE needs to monitor a PDCCH on the on duration timer, and otherwise, does not monitor a PDCCH. The DCP can only be configured on a Primary cell (Pcell). The DCI format 2_6 exists in the outside active time, that is, outside the active time.

A power saving mode switching method in the embodiments of the present disclosure is described below.

FIG. 3 is a first flowchart of a power saving mode switching method according to an embodiment of the present disclosure. The power saving mode switching method in this embodiment of the present disclosure is applied to a terminal. In actual application, the terminal may be a mobile phone, a tablet personal computer, a laptop computer, a Personal Digital Assistant (PDA), a Mobile Internet Device (MID), a wearable device, a vehicle-mounted device, or the like.

As shown in FIG. 3, the mode switching method applied to the terminal may include the following steps:

Step 301: Perform a switching operation at a first moment before on duration of a DRX cycle, where the switching operation is used to switch a first cell of the terminal to a target power saving mode.

In some embodiments, the terminal performs the switching operation before a start moment of the on duration of the DRX cycle, that is, the terminal starts to perform the switching operation before entering the on duration of the DRX cycle.

For example, the terminal may start to perform the switching operation after an end moment of on duration of an $(i-1)^{th}$ DRX cycle and before a start moment of on duration of an $i^{th}$ DRX cycle, where i is a positive integer.

In this way, compared with that the terminal performs the switching operation in the on duration of the DRX cycle, a data transmission delay can be reduced by switching to the target power saving mode in advance, and power of the terminal is saved.

In this embodiment, the terminal may switch a power saving mode of the first cell to the target power saving mode by performing the switching operation, or activate the target power saving mode in the first cell.

In some embodiments, behavior of the terminal to perform the switching operation at the first moment before the on duration of the DRX cycle may be configured by a network side device or agreed upon in a protocol. In a case that the foregoing behavior is configured by the network side device, in some embodiments, before the performing a switching operation at a first moment before on duration of a DRX cycle, the method further includes: receiving first indication information sent by the network side device, where the first indication information is used to instruct the terminal to perform the switching operation at the first moment before the on duration of the DRX cycle.

In some embodiments, the network may configure a target power saving mode inactivity timer corresponding to the target power saving mode. After the first cell is switched to the target power saving mode at the first moment corresponding to the current DRX cycle, the terminal may start the target power saving mode inactivity timer. During running of the target power saving mode inactivity timer, the first cell may keep working in the target power saving mode. After the target power saving mode inactivity timer expires, the first cell may be immediately switched back to the first power saving mode, where the first power saving mode is a power saving mode of the first cell before the first cell is switched to the target power saving mode. It should be understood that, after the first cell is switched from the target power saving mode to the first mode, the switching operation may still be performed at a first moment corresponding to a next DRX cycle, so that the first cell is switched to the target power saving mode.

In the power saving mode switching method in this embodiment, the switching operation is performed before the start moment of the on duration of the DRX cycle, to switch the first cell of the terminal to the target power saving mode, that is, enter the on duration of the DRX cycle in the target power saving mode.

In the embodiment corresponding to FIG. 3, for example, the performing a switching operation at a first moment before on duration of a DRX cycle includes:

performing the switching operation at a first moment before on duration of each DRX cycle.

In this embodiment, the on duration of each DRX cycle has a first moment corresponding to the DRX cycle. For example, if the terminal is configured with P DRX cycles, the terminal includes P first moments, and a first moment corresponding to each DRX cycle is before on duration of the DRX, where P is a positive integer.

The first moment is described below.

In some embodiments, the terminal may determine the first moment by using a first offset and a start moment of the on duration of the DRX cycle, where the first offset is an offset of the first moment relative to the start moment of the on duration of the DRX cycle. In other words, the terminal may select the start moment of the on duration of the DRX cycle as a reference moment, and then determine the first moment based on the reference moment and an offset related to the reference moment. However, it should be understood that in some implementations, the terminal may select another moment as the reference moment, for example, the reference moment may be an end moment of the on duration of the DRX cycle, or a moment that is spaced by a preset time domain resource from the start moment of the on duration of the DRX cycle.

It may be learned from the foregoing content that a length of active time of one DRX cycle may be greater than or equal to a length of on duration of the DRX cycle.

In some embodiments, the first moment is located before the on duration of the DRX cycle and outside the active time.

In some embodiments, the first moment may be located before the start moment of the on duration of the DRX cycle and outside the active time.

In this embodiment, if the first moment determined by the terminal by using the first offset and the start moment of the on duration of the DRX cycle is within the active time, the terminal does not perform the switching operation corresponding to the DRX cycle. In other words, the terminal performs the switching operation corresponding to the DRX cycle only if the first moment is before the start moment of the on duration of the DRX cycle and is outside the active time.

For example, it is assumed that the terminal needs to be in the target power saving mode in on duration of an $i^{th}$ DRX cycle, and active time of an $(i-1)^{th}$ DRX cycle is greater than the on duration; and if the first moment determined by the terminal is within inactive time of the $(i-1)^{th}$ DRX cycle, the terminal may perform the switching operation at the first moment; otherwise, the terminal may not perform the switching operation at the first moment.

For example, for the $i^{th}$ DRX cycle, the terminal determines a position of the first moment by using the first offset and the start moment of the on duration of the DRX cycle, where i is a positive integer. The active time of the $(i-1)^{th}$ DRX cycle is greater than the on duration. If the first moment of the $i^{th}$ DRX cycle is not within the active time, the switching operation is not performed at the first moment corresponding to the $i^{th}$ DRX cycle. If the first moment of the $i^{th}$ DRX cycle is located before the start moment of the on duration of the DRX cycle and outside the active time, the switching operation is performed at a first moment corresponding to the $i^{th}$ DRX cycle.

In the foregoing embodiment, the switching operation may not affect data transmission in the active time, and therefore, data transmission reliability can be improved.

However, it should be understood that, in another implementation, the first moment may be located before the start moment of the on duration of the DRX cycle, but is located within the active time. In this embodiment, the terminal can still perform the switching operation at the first moment even if the first moment determined by the terminal is within the active time. The first offset is described below.

In some embodiments, the first offset of the first moment relative to the start moment of the on duration of the DRX cycle may be configured by a network side device or agreed upon in a protocol.

In a case that the first offset is configured by the network side device, before the performing a switching operation at a first moment before on duration of a DRX cycle, the method further includes:

receiving second indication information sent by the network side device, where the second indication information is used to indicate the first offset.

In some embodiments, the first offset is related to at least one of the following: a capability of the terminal, a SCS, a preferred offset reported by the terminal, or a BWP switch delay.

Specific descriptions are as follows:

(a) In a case that the first offset is related to the capability of the terminal, the first offset may be configured by the network side device. In specific implementation, in one implementation, the terminal may report the capability of the terminal to the network side device, so that the network side device determines the first offset based on the capability of the terminal reported by the terminal, and the terminal determines the first moment based on the first offset reported by the network side device based on the capability, and performs the switching operation. In another implementation, the terminal may determine a reference offset based on the capability of the terminal, and report the reference offset to the network side device, so that the network side device determines the first offset based on the reference offset, where the first offset determined by the network side device may be greater than or equal to the reference offset. The network side device configures the first offset to the terminal.

(b) In a case that the first offset is related to the SCS, the first offset may be agreed upon in the protocol. In specific implementation, the first offset may be specified in the protocol based on different SCS levels.

(c) In a case that the first offset is related to the preferred offset reported by the terminal, the first offset may be configured by the network side device. In some embodiments, the terminal may report the preferred offset, so that the network side device determines the first offset based on the preferred offset, and the first offset determined by the network side device may be greater than or equal to the preferred offset. The network side device configures the first offset to the terminal.

During implementation, the terminal may report the preferred offset by using assistance information, or may report the preferred offset by using other information. A reporting manner of the preferred offset is not limited in the present disclosure.

(d) In a case that the first offset is related to the BWP switch delay, for example, the first offset may be greater than or equal to the BWP switch delay. In this way, it can be ensured that the terminal completes, before the start moment of the on duration of the DRX cycle, the switching operation of switching the first cell to the target power saving mode, that is, the terminal is already in the target power saving mode when or before the on duration of the DRX cycle starts. For the BWP switch delay, refer to the foregoing descriptions. Details are not described herein again.

It should be noted that in a scenario in which the terminal reports the terminal capability, the reference offset, or the preferred offset, the network side device may independently determine whether to determine the first offset based on content reported by the terminal. In other words, the first offset finally configured by the network side device may be determined based on the content reported by the terminal, or may not be determined based on the content reported by the terminal. For example, the terminal reports the preferred offset, but the first offset finally configured by the network side device is equal to the BWP switch delay, and is not equal to the preferred offset reported by the terminal.

In the embodiment corresponding to FIG. 3, for example, an end moment of the switching operation is before or at a start moment of the on duration of the DRX cycle. In this way, it can be ensured that the terminal completes, before the start moment of the on duration of the DRX cycle, the switching operation of switching the first cell to the target power saving mode, that is, the terminal is already in the target power saving mode when or before the on duration of the DRX cycle starts.

It should be noted that, in another implementation, the end moment of the switching operation may be after the start moment of the on duration of the DRX cycle, but the first moment is always before the start moment of the on duration of the DRX cycle.

In the embodiment corresponding to FIG. 3, for example, the first cell is any one of the following: all serving cells of the terminal or any one or more serving cells of the terminal.

In some embodiments, any one or more serving cells of the terminal may be: a primary cell PCell of the terminal and all Secondary Cell (SCell) of the terminal, but is not limited thereto.

Further, all serving cells of the terminal may be all serving cells activated by the terminal, and all secondary cells of the terminal may be all secondary cells activated by the terminal.

In a case that the first cell includes multiple cells, a function object of the switching operation performed by the terminal may include each cell in the first cell, that is, each cell in the first cell is switched to the target power saving mode.

It may be understood that the target power saving mode may be independently configured for each cell.

In the multiple cells, different cells may perform different target power saving mode switching operations, that is, the cells may be configured with different target power saving modes, to separately perform target power saving mode switching operations corresponding to the cells.

For example, in a carrier aggregation scenario, the terminal is configured with three active serving cells, one cell is a PCell, and the other two are SCells. A switching operation of a target power saving mode specified in the network or the protocol may be performed in all the three serving cells, or may be performed only on the SCell or the PCell. In another embodiment, the network separately configures different target power saving modes for the three serving cells, and each serving cell performs a different target power saving mode switching operation.

The target power saving mode is described below.

In some embodiments, the target power saving mode is configured by the network side device or agreed upon in a protocol.

In a case that the target power saving mode is configured by the network side device, for example, before the performing a switching operation at a first moment before on duration of a DRX cycle, the method further includes:

receiving third indication information sent by the network side device, where the third indication information is used to indicate the target power saving mode.

In some embodiments, the target power saving mode is determined by using at least one of the following parameters:

a target bandwidth part BWP, the number of transmit antennas or transmit channels, the number of receive antennas or receive channels, a maximum number of downlink Multiple-Input Multiple-Output (MIMO) layers, a maximum number of uplink MIMO layers, a COntrol REsource SET (CORESET), a search space set group, search space, a bandwidth size of a BWP, uplink component carriers with same active time, downlink component carriers with same active time, a time interval between a Physical Downlink Control CHannel (PDCCH) and a Physical Downlink Shared CHannel (PDSCH) scheduled by the PDCCH, a time interval between a PDSCH and a Hybrid Automatic Repeat reQuest-ACKnowledgement (HARQ-ACK), a time interval between a PDCCH and a Physical Uplink Shared CHannel (PUSCH) scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of Channel State Information (CSI) simultaneously processed by the terminal, the number of beam management reports simultaneously processed by the terminal, the number of measurement resources simultaneously received or processed by the terminal, a delay related to a CSI report, and a delay related to a beam management report.

In some embodiments, the foregoing parameters may be configured by the network side and/or specified in a protocol. In a case that the foregoing parameters may be configured by the network side and agreed upon in the protocol, some parameters in the foregoing parameters are specified by the network side device and the other parameters are specified in the protocol.

In some embodiments, the target BWP is any one of the following: a dormant BWP, a default BWP, a first non-dormant BWP, a first active BWP, or a BWP configured by the terminal.

In some embodiments, the target BWP may be indicated in a manner such as an identifier or an index. It should be understood that other parameters such as CORESET, search space set group, and search space may also be indicated in a similar manner.

The time interval between the PDSCH and the HARQ-ACK may be a time interval between the PDSCH and an ACKnowledgement (ACK), or a time interval between the PDSCH and a Negative ACKnowledgement (NACK).

In the embodiment corresponding to FIG. 3, for example, the performing a switching operation at a first moment before on duration of a DRX cycle includes:

in a case that the terminal has a capability of performing the switching operation, performing the switching operation at the first moment before the on duration of the DRX cycle.

In this implementation, performing the switching operation may be considered as a capability of the terminal. It should be understood that, in a case that the terminal does not have the capability, the terminal may not perform the switching operation.

Further, the terminal may send fourth indication information to the network side device, where the fourth indication information is used to indicate whether the terminal has a capability of performing the switching operation. In this way, in a case that the terminal performs the switching operation at the first moment before the on duration of the DRX cycle, the network side device may send the first indication information only when the received fourth indication information indicates that the terminal has the capability of performing the switching operation, so that signaling overheads can be reduced.

In the embodiment corresponding to FIG. 3, for example, the terminal is not configured with first Downlink Control Information (DCI), the first DCI is scrambled by using a Power Saving Radio Network Temporary Identifier (PS-RNTI), and a format of the first DCI is a DCI format 2_6.

It should be understood that the first DCI is a DCP. It can be learned that in this implementation, the terminal is configured with a DRX mechanism, but is configured with no DCP. However, it should be understood that, in some implementations, the terminal may be configured with a DRX mechanism and configured with a DCP.

In the embodiment corresponding to FIG. 3, for example, before the performing a switching operation at a first moment before on duration of a DRX cycle, the method further includes:

receiving configuration information, where the configuration information indicates whether the terminal performs the switching operation at the first moment before the on duration of the DRX cycle.

In some embodiments, the terminal may determine, by receiving the configuration information, whether to perform the switching operation. The configuration information may be RRC signaling, MAC-CE signaling, or DCI.

For example, at a moment, the terminal receives MAC CE signaling sent by the network side, and the signaling instructs the terminal to stop performing the switching operation at the first moment before the on duration of the DRX cycle. The terminal immediately stops at a first moment before on duration of a next DRX cycle according to the instruction of the signaling, and performs the switching operation. At another moment after the moment, the terminal receives the MAC CE signaling sent by the network side, and the signaling instructs the terminal to start to perform the switching operation at the first moment before the on duration of the DRX cycle. The terminal immediately starts to the behavior of performing the switching operation at a first moment before on duration of a next DRX cycle according to the instruction of the signaling.

It should be noted that multiple implementations described in this embodiment of the present disclosure may be implemented in combination with each other, or may be separately implemented. This is not limited in this embodiment of the present disclosure.

For ease of understanding, example descriptions are as follows:

(1) The UE is configured with a DRX mechanism. Before the UE enters active time from outside active time, the UE switches a user to the target power saving mode in advance, to ensure that an active power saving mode of the UE at the start of the active time is the target power saving mode.

When the UE a period of time before the active time from the outside active time, the UE switches the user to the target power saving mode, or when the UE enters the outside active time from the active time, the UE switches the user to the target power saving mode, to ensure that the terminal enters the active time in the target power saving mode.

(2) Switching to the target power saving mode may be for one of the following: all serving cells, only a Pcell, or only all Scells.

(3) The network side device or the protocol specifies that a Cell Group (CG) of the UE is configured with one target power saving mode, or different cells of the UE may be independently configured with a same target power saving mode or different target power saving modes.

(4) The target power saving mode may be configured by a network or specified in a protocol.

(5) The period of time refers to a value range N of an offset of a time position at which the UE is switched to the target power saving mode relative to a start position of the active time.

(6) A value of N may be one of the following:

being reported to a base station by the UE based on a capability;

being specified in the protocol based on different SCS levels; and a preferred N value that is carried by the UE in reported assistance information; where N is greater than or equal to a value of the BWP switch delay.

(7) Configuration information of the target power saving mode includes one or more of the following parameters:

a target BWP, where the target BWP may be any one of the following: a dormant BWP (RRC configuration parameter), a default BWP (RRC configuration parameter), a first non-dormant BWP (RRC configuration parameter: first-non-dormant-BWP-ID-for-DCI-outside-active-time), a first-active BWP (RRC configuration parameter), or a BWP corresponding to any BWP ID;

the number of transmit antennas or transmit channels;
the number of receive antennas or receive channels;
the maximum number of downlink MIMO layers;
the maximum number of uplink MIMO layers;
a configured CORESET;
a configured Search Space set group (SS set group);
configured search space;
a BWP bandwidth size;
simultaneously activated uplink component carriers;
simultaneously activated downlink component carriers;
a time interval between a PDCCH and a PDSCH scheduled by the PDCCH;
a time interval between a PDSCH and an ACK or a NACK;
a time interval between a PDCCH and a PUSCH scheduled by the PDCCH;
a PDSCH processing delay;
a PUSCH preparation delay;
a PDCCH monitoring cycle;
a PDCCH monitoring offset;
PDCCH monitoring duration;
a maximum uplink transmission rate;
a maximum downlink transmission rate;
the number of CSI reports simultaneously processed by the terminal;
the number of beam management reports simultaneously processed by the terminal;
the number of measurement resources simultaneously received or processed by the terminal;
a delay related to a CSI report; and
a delay related to a beam management report.

(8) The network configures the configuration information of the target power saving mode.

(9) The terminal may report whether the network has the capability of switching to the target power saving mode.

(10) The terminal is not configured with a DCP.

Embodiment 1: The Target Power Saving Mode Refers to a Target BWP

The UE has two serving cells. The network configures a DRX mechanism for the UE and does not configure a DCP. The target BWP is configured as a BWP with maximum bandwidth in all BWPs configured for the UE, and is referred to as a data efficiency BWP. Before the UE enters DRX on duration (the on duration of the DRX cycle) from DRX off (inactive time), current active BWPs of all serving cells of the UE are preset as data efficiency BWPs. A value of the offset N is set to a value greater than the BWP switch delay.

For BWP switching, reference may be made to FIG. 4. In FIG. 4, t0 is the first moment, that is, the terminal starts to perform the switching operation at t0. t1 is an end moment of the switching operation, that is, the terminal ends the switching operation at t1, and the data efficiency BWP, that is, the target BWP, takes effect at t1. t2 is a start moment of the on duration of the DRX cycle. t0 to t1 is equal to the BWP switch delay.

In this embodiment of the present disclosure, the UE is configured with a DRX mechanism but is configured with no DCP. Before the UE enters active time from outside active time, the UE switches a user to the target power saving mode in advance, to ensure that an active power saving mode of the UE at the start of the active time is the target power saving mode. In this way, for a periodic service, in the outside active time, a current active BWP is switched to a predefine BWP in advance to meet different service features, so that power of the terminal is saved.

FIG. 5 is a second flowchart of a power saving mode switching method according to an embodiment of the present disclosure. The power saving mode switching method in this embodiment of the present disclosure is applied to a network side device. In actual application, the network side device may be a base station, a relay, an access point, or the like.

As shown in FIG. 5, the power saving mode switching method applied to the network side device may include the following steps:

Step 501: Send first indication information to a terminal, where the first indication information is used to instruct the terminal to perform a switching operation at a first moment before on duration of a DRX cycle, and the switching operation is used to switch a first cell of the terminal to a target power saving mode.

In the power saving mode switching method in this embodiment, the first indication information is sent to the terminal, so that the terminal starts to perform the switching operation before the on duration of the DRX cycle, and a time at which the terminal performs the switching operation is advanced. In this way, power consumption caused when the terminal performs power saving mode switching in the on duration of the DRX cycle can be reduced or avoided, and power of the terminal is saved; and further, a transmission delay of the to-be-transmitted data can be reduced, and transmission efficiency of the to-be-transmitted data can be improved.

In some embodiments, the first indication information is used to instruct the terminal to perform the switching operation at a first moment before on duration of each DRX cycle.

In some embodiments, the first moment is located before the on duration of the DRX cycle and outside the active time.

In some embodiments, before the sending first indication information to the terminal, the method further includes:

sending second indication information to the terminal, where the second indication information is used to indicate a first offset of the first moment relative to a start moment of the on duration of the DRX cycle.

In some embodiments, the first offset is related to at least one of the following: a capability of the terminal, a SCS, a preferred offset reported by the terminal, or a BWP switch delay.

In some embodiments, an end moment of the switching operation is before or at a start moment of the on duration of the DRX cycle.

In some embodiments, the first cell is any one of the following: all serving cells of the terminal or any one or more serving cells of the terminal.

In some embodiments, before the sending first indication information to the terminal, the method further includes:

sending third indication information to the terminal, where the third indication information is used to indicate the target power saving mode.

In some embodiments, the target power saving mode is determined by using at least one of the following parameters:

a target BWP, the number of transmit antennas or transmit channels, the number of receive antennas or receive channels, a maximum number of downlink MIMO layers, a maximum number of uplink MIMO layers, a CORESET, a search space group, search space, a bandwidth size of a BWP, uplink component carriers with same active time, downlink component carriers with same active time, a time interval between a PDCCH and a PDSCH scheduled by the PDCCH, a time interval between a PDSCH and a HARQ-ACK, a time interval between a PDCCH and a PUSCH scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of CSI simultaneously processed by the terminal, the number of beam management reports simultaneously processed by the terminal, the number of measurement resources simultaneously received or processed by the terminal, a delay related to a CSI report, and a delay related to a beam management report.

In some embodiments, the target BWP is any one of the following: a dormant BWP, a default BWP, a first non-dormant BWP, a first active BWP, or a BWP configured by the terminal.

In some embodiments, before the sending first indication information to the terminal, the method further includes:

receiving fourth indication information sent by the terminal, where the fourth indication information is used to indicate whether the terminal has a capability of performing the switching operation; and the sending first indication information to a terminal includes:

sending the first indication information to the terminal in a case that the fourth indication information indicates that the terminal has the capability of performing the switching operation.

In some embodiments, the terminal is not configured with first DCI, the first DCI is scrambled by using a PS-RNTI, and a format of the first DCI is a DCI format 2_6.

In some embodiments, after the sending first indication information to the terminal, the method further includes:

sending configuration information to the terminal, where the configuration information indicates whether the terminal performs the switching operation at the first moment before the on duration of the DRX cycle.

It should be noted that this embodiment is used as an implementation of the network side corresponding to the method embodiment. Therefore, reference may be made to related descriptions in the foregoing method embodiment, and a same beneficial effect may be achieved. To avoid repetition of description, details are not described herein again.

Figure 6:
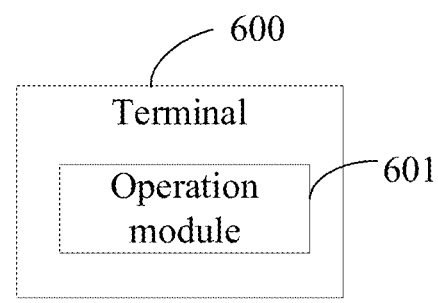
FIG. 6 is a first structural diagram of a structure of a terminal according to an embodiment of the present disclosure.

FIG. 6 is a first structural diagram of a structure of a terminal according to an embodiment of the present disclosure. As shown in FIG. 6, a terminal 600 includes:

an operation module 601, configured to perform a switching operation at a first moment before on duration of a DRX cycle, where the switching operation is used to switch a first cell of the terminal to a target power saving mode.

In some embodiments, the operation module 601 is configured to perform the switching operation at a first moment before on duration of each DRX cycle.

In some embodiments, the first moment is located before the on duration of the DRX cycle and outside the active time.

In some embodiments, the first offset of the first moment relative to the start moment of the on duration of the DRX cycle is configured by a network side device or agreed upon in a protocol.

In some embodiments, the first offset is related to at least one of the following: a capability of the terminal, a SCS, a preferred offset reported by the terminal, or a BWP switch delay.

In some embodiments, an end moment of the switching operation is before or at a start moment of the on duration of the DRX cycle.

In some embodiments, the first cell is any one of the following: all serving cells of the terminal or any one or more serving cells of the terminal.

In some embodiments, the target power saving mode is configured by the network side device or agreed upon in a protocol.

In some embodiments, the target power saving mode is determined by using at least one of the following parameters:

a target BWP, the number of transmit antennas or transmit channels, the number of receive antennas or receive channels, a maximum number of downlink MIMO layers, a maximum number of uplink MIMO layers, a CORESET, a search space group, search space, a bandwidth size of a BWP, uplink component carriers with same active time, downlink component carriers with same active time, a time interval between a PDCCH and a PDSCH scheduled by the PDCCH, a time interval between a PDSCH and a HARQ-ACK, a time interval between a PDCCH and a PUSCH scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of CSI simultaneously processed by the terminal, the number of beam management reports simultaneously processed by the terminal, the number of measurement resources simultaneously received or processed by the terminal, a delay related to a CSI report, and a delay related to a beam management report.

In some embodiments, the target BWP is any one of the following: a dormant BWP, a default BWP, a first non-dormant BWP, a first active BWP, or a BWP configured by the terminal.

In some embodiments, the operation module is configured to:

in a case that the terminal has a capability of performing the switching operation, perform the switching operation at the first moment before the on duration of the DRX cycle.

In some embodiments, the terminal is not configured with first DCI, the first DCI is scrambled by using a PS-RNTI, and a format of the first DCI is a DCI format 2_6.

In some embodiments, the terminal further includes:

a first receiving module, configured to receive configuration information, where the configuration information indicates whether the terminal performs the switching operation at the first moment before the on duration of the DRX cycle.

The terminal 600 can implement processes implemented by the terminal in the method embodiments of the present disclosure and achieve the same beneficial effect. To avoid repetition, details are not described herein again.

Figure 7:
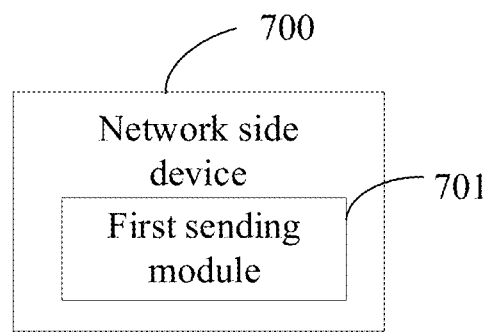
FIG. 7 is a first structural diagram of a network side device according to an embodiment of the present disclosure.

FIG. 7 is a first structural diagram of a network side device according to an embodiment of the present disclosure. As shown in FIG. 7, a network side device 700 includes:

a first sending module 701, configured to send first indication information to a terminal, where the first indication information is used to instruct the terminal to perform a switching operation at a first moment before on duration of a DRX cycle, and the switching operation is used to switch a first cell of the terminal to a target power saving mode.

In some embodiments, the first indication information is used to instruct the terminal to perform the switching operation at a first moment before on duration of each DRX cycle.

In some embodiments, the first moment is located before the on duration of the DRX cycle and outside the active time.

In some embodiments, the network side device 700 further includes:

a second sending module, configured to send second indication information to the terminal, where the second indication information is used to indicate a first offset of the first moment relative to a start moment of the on duration of the DRX cycle.

In some embodiments, the first offset is related to at least one of the following: a capability of the terminal, a SCS, a preferred offset reported by the terminal, or a BWP switch delay.

In some embodiments, an end moment of the switching operation is before or at a start moment of the on duration of the DRX cycle.

In some embodiments, the first cell is any one of the following: all serving cells of the terminal or any one or more serving cells of the terminal.

In some embodiments, the network side device 700 further includes:

a third sending module, configured to send third indication information to the terminal, where the third indication information is used to indicate the target power saving mode.

In some embodiments, the target power saving mode is determined by using at least one of the following parameters:

a target BWP, the number of transmit antennas or transmit channels, the number of receive antennas or receive channels, a maximum number of downlink MIMO layers, a maximum number of uplink MIMO layers, a CORESET, a search space group, search space, a bandwidth size of a BWP, uplink component carriers with same active time, downlink component carriers with same active time, a time interval between a PDCCH and a PDSCH scheduled by the PDCCH, a time interval between a PDSCH and a HARQ-ACK, a time interval between a PDCCH and a PUSCH scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of CSI simultaneously processed by the terminal, the number of beam management reports simultaneously processed by the terminal, the number of measurement resources simultaneously received or processed by the terminal, a delay related to a CSI report, and a delay related to a beam management report.

In some embodiments, the target BWP is any one of the following: a dormant BWP, a default BWP, a first non-dormant BWP, a first active BWP, or a BWP configured by the terminal.

In some embodiments, the network side device 700 further includes:

a second receiving module, configured to receive fourth indication information sent by the terminal, where the fourth indication information is used to indicate whether the terminal has a capability of performing the switching operation; and the first sending module 701 is configured to:

send the first indication information to the terminal in a case that the fourth indication information indicates that the terminal has the capability of performing the switching operation.

In some embodiments, the terminal is not configured with first DCI, the first DCI is scrambled by using a PS-RNTI, and a format of the first DCI is a DCI format 2_6.

In some embodiments, the network side device further includes:

a fourth sending module, configured to send configuration information to the terminal, where the configuration information indicates whether the terminal performs the switching operation at the first moment before the on duration of the DRX cycle.

The network side device 700 can implement processes implemented by the network side device in the method embodiments of the present disclosure and achieve the same beneficial effect. To avoid repetition, details are not described herein again.

Figure 8:
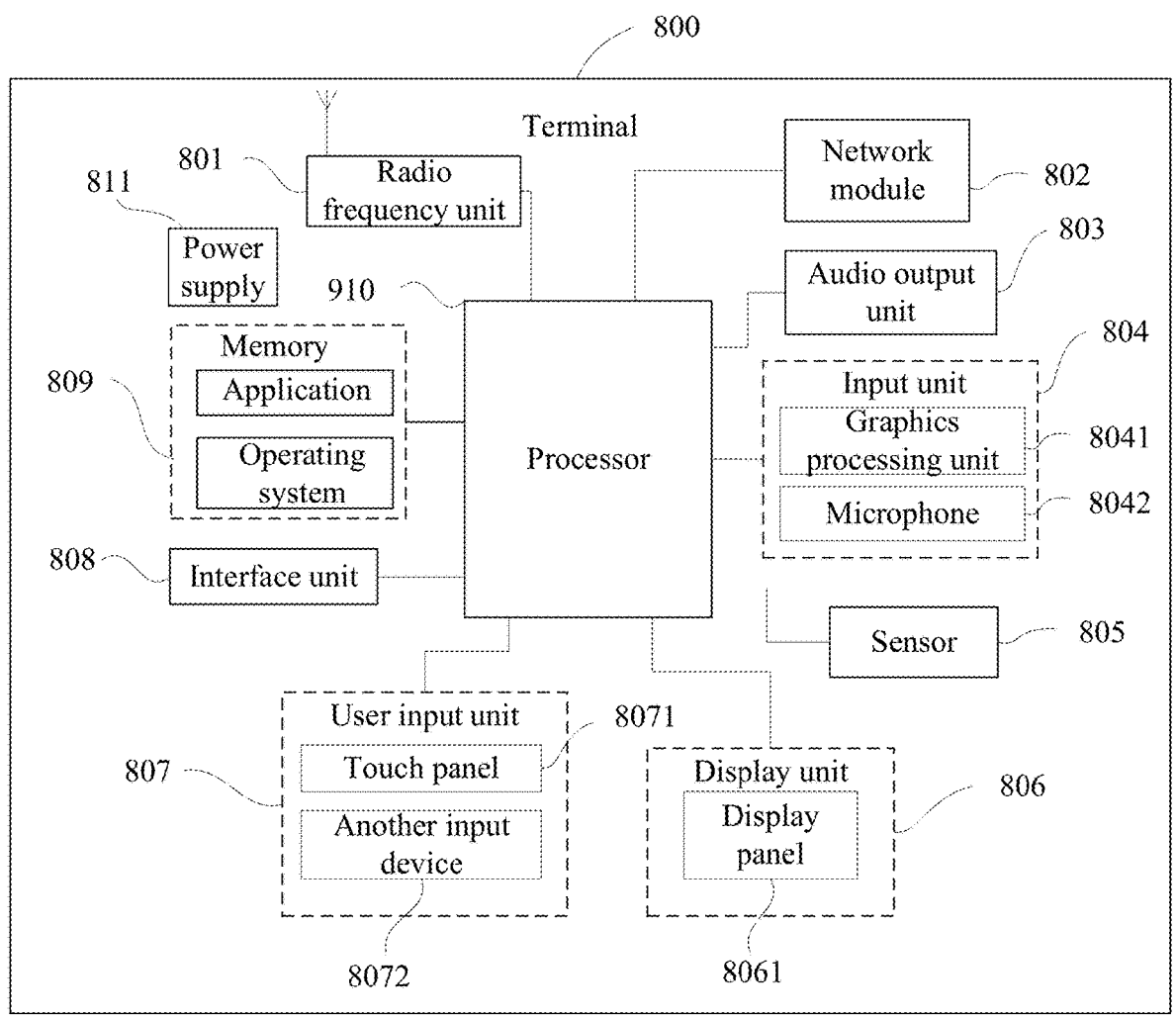
FIG. 8 is a second structural diagram of a terminal according to an embodiment of the present disclosure.

FIG. 8 is a second structural diagram of a terminal according to an embodiment of the present disclosure. The terminal may be a terminal that implements the embodiments of the present disclosure. As shown in FIG. 8, a terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 810 is configured to:

perform a switching operation at a first moment before on duration of a DRX cycle, where the switching operation is used to switch a first cell of the terminal to a target power saving mode.

In some embodiments, the processor 810 is configured to perform the switching operation at a first moment before on duration of each DRX cycle.

In some embodiments, the first moment is located before the on duration of the DRX cycle and outside the active time.

In some embodiments, the first offset of the first moment relative to the start moment of the on duration of the DRX cycle is configured by a network side device or agreed upon in a protocol.

In some embodiments, the first offset of the first moment relative to the start moment of the on duration of the DRX cycle is related to at least one of the following: a capability of the terminal, a SCS, a preferred offset reported by the terminal, or a BWP switch delay.

In some embodiments, an end moment of the switching operation is before or at a start moment of the on duration of the DRX cycle.

In some embodiments, the first cell is any one of the following: all serving cells of the terminal or any one or more serving cells of the terminal.

In some embodiments, the target power saving mode is configured by the network side device or agreed upon in a protocol.

In some embodiments, the target power saving mode is determined by using at least one of the following parameters:

a target bandwidth part BWP, the number of transmit antennas or transmit channels, the number of receive antennas or receive channels, a maximum number of downlink MIMO layers, a maximum number of uplink MIMO layers, a CORESET, a search space group, search space, a bandwidth size of a BWP, uplink component carriers with same active time, downlink component carriers with same active time, a time interval between a PDCCH and a PDSCH scheduled by the PDCCH, a time interval between a PDSCH and a HARQ-ACK, a time interval between a PDCCH and a PUSCH scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of CSI simultaneously processed by the terminal, the number of beam management reports simultaneously processed by the terminal, the number of measurement resources simultaneously received or processed by the terminal, a delay related to a CSI report, and a delay related to a beam management report.

In some embodiments, the target BWP is any one of the following: a dormant BWP, a default BWP, a first non-dormant BWP, a first active BWP, or a BWP configured by the terminal.

In some embodiments, the operation module is configured to:

in a case that the terminal has a capability of performing the switching operation, perform the switching operation at the first moment before the on duration of the DRX cycle.

In some embodiments, the terminal is not configured with first DCI, the first DCI is scrambled by using a PS-RNTI, and a format of the first DCI is a DCI format 2_6.

In some embodiments, the radio frequency unit 801 is configured to receive configuration information, where the configuration information indicates whether the terminal performs the switching operation at the first moment before the on duration of the DRX cycle.

It should be noted that the terminal 800 in this embodiment can implement each process implemented by the terminal in the method embodiment in the embodiments of the present disclosure, and achieve a same technical effect. To avoid repetition, details are not described herein again.

It should be understood that, in this embodiment of the present disclosure, the radio frequency unit 801 may be configured to receive and send information or receive and send a signal in a call process. In some embodiments, after downlink data from a base station is received, the processor 810 processes the downlink data. In addition, uplink data is sent to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device by using a wireless communication system.

The terminal provides wireless broadband Internet access for a user by using a network module 802, for example, helping the user send and receive an email, browsing a web page, and accessing streaming media.

The audio output unit 803 may convert audio data received by the radio frequency unit 801 or the network module 802 or stored in the memory 809 into an audio signal and output as sound. In addition, the audio output unit 803 may further provide audio output (for example, call signal receiving sound or message receiving sound) related to a specific function performed by the terminal 800. The audio output unit 803 includes a loudspeaker, a buzzer, a telephone receiver, and the like.

The input unit 804 is configured to receive an audio or video signal. The input unit 804 may include a Graphics Processing Unit (GPU) 8041 and a microphone 8042. The graphics processing unit 8041 processes image data of a static picture or a video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. The processed audio data may be output by being converted into a format that may be sent to a mobile communications base station by using the radio frequency unit 801 in a telephone call mode.

The terminal 800 further includes at least one sensor 805, such as an optical sensor, a motion sensor, and another sensor. In some embodiments, the optical sensor includes an ambient light sensor and a proximity sensor. The ambient light sensor may adjust luminance of the display panel 8061 based on brightness of ambient light, and the proximity sensor may disable the display panel 8061 and/or backlight when the terminal 800 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 805 may further include a fingerprint sensor, a pressure sensor, an iris sensor, a molecular sensor, a gyroscope, a barometer, a hygrometer, a thermometer, an infrared sensor, and the like. This is not described herein.

The display unit 806 is configured to display information entered by the user or information provided for the user. The display unit 806 may include a display panel 8061, and the display panel 8061 may be configured in a form of a Liquid Crystal Display (LCD), an Organic Light-Emitting Diode (OLED), or the like.

The user input unit 807 may be configured to receive input digit or character information and generate key signal input related to user setting and function control of a terminal. In some embodiments, the user input unit 807 includes a touch panel 8071 and another input device 8072. The touch panel 8071, also referred to as a touchscreen, may collect a touch operation performed by the user on or near the touch panel 8071 (for example, an operation performed by the user on or near the touch panel 8071 by using any suitable object or accessory such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented by using a plurality of types such as a resistive type, a capacitive type, an infrared ray, and a surface acoustic wave. The user input unit 807 may include another input device 8072 in addition to the touch panel 8071. In some embodiments, the another input device 8072 may include but is not limited to one or more of a physical keyboard, a function key (such as a volume control key or an on/off key), a trackball, a mouse, a joystick, and the like. Details are not described herein.

Further, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface connecting an external apparatus to the terminal 800. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 808 may be configured to receive input (for example, data information and power) from the external apparatus and transmit the received input to one or more elements in the terminal 800, or may be configured to transmit data between the terminal 800 and the external apparatus.

The memory 809 may be configured to store a software program and various data. The memory 809 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 809 may include a high-speed random access memory, and may further include a non-volatile memory such as at least one magnetic disk storage component, a flash memory component, or another volatile solid-state storage component.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 may include one or more processing units. In some embodiments, the processor 810 may be integrated with an application processor and a modem processor. The application processor mainly processes an operating system, a user interface, an application program, and the like, and the modem processor mainly processes wireless communication. It may be understood that the modem processor may not be integrated into the processor 810.

The terminal 800 may further include a power supply 811 (such as a battery) that supplies power to each component. Preferentially, the power supply 811 may be logically connected to the processor 810 by using a power management system, to implement functions such as charging, discharging, and power consumption management by using the power management system.

In addition, the terminal 800 includes some function modules not shown, and details are not described herein.

For example, an embodiment of the present disclosure further provides a terminal, including a processor 810, a memory 809, and a computer program that is stored in the memory 809 and that can run on the processor 810. When the computer program is executed by the processor 810, processes of the embodiments of the power saving mode switching method applied to the terminal can be implemented, and a same technical effect can be achieved. To avoid repetition, details are not described herein.

Figure 9:
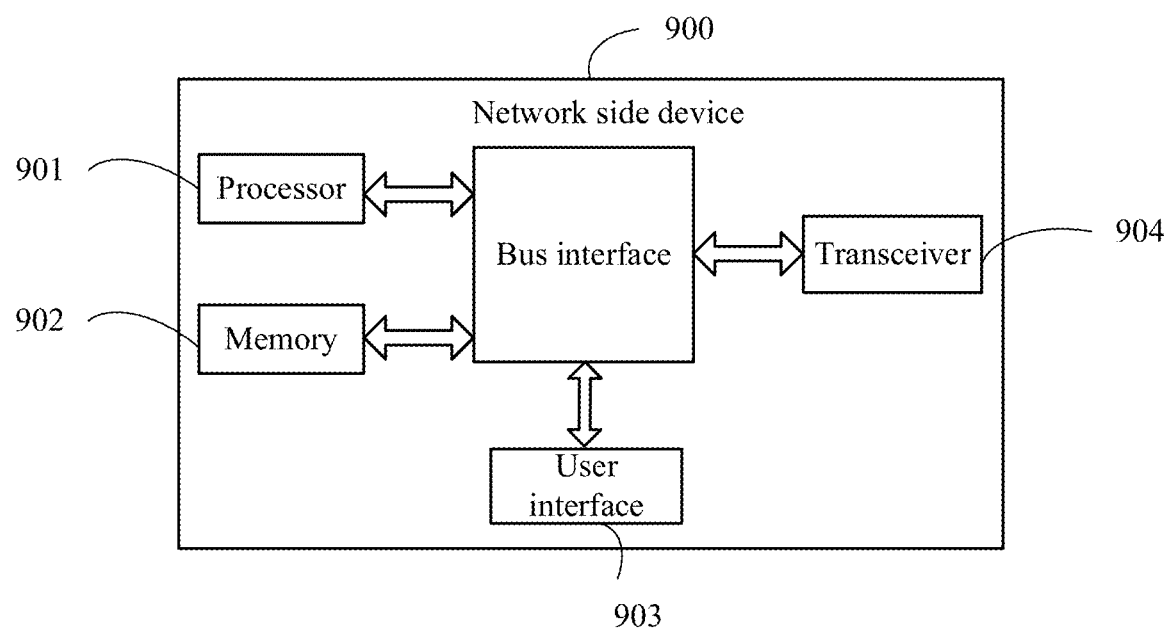
FIG. 9 is a second structural diagram of a network side device according to an embodiment of the present disclosure.

FIG. 9 is a structural diagram 2 of a network side device according to an embodiment of the present disclosure. As shown in FIG. 9, a network side device 900 includes a processor 901, a memory 902, a user interface 903, a transceiver 904, and a bus interface.

In this embodiment of the present disclosure, the network side device 900 further includes a computer program that is stored in the memory 902 and that can run on the processor 901. When the computer program is executed by the processor 901, the following steps are implemented:

sending first indication information to a terminal by using the transceiver 904, where the first indication information is used to instruct the terminal to perform a switching operation at a first moment before on duration of a DRX cycle, and the switching operation is used to switch a first cell of the terminal to a target power saving mode.

In some embodiments, the first indication information is used to instruct the terminal to perform the switching operation at a first moment before on duration of each DRX cycle.

In some embodiments, the first moment is located before the on duration of the DRX cycle and outside the active time.

In some embodiments, when the computer program is executed by the processor 901, the following steps may be further implemented:

sending second indication information to the terminal by using the transceiver 904, where the second indication information is used to indicate a first offset of the first moment relative to a start moment of the on duration of the DRX cycle.

In some embodiments, the first offset is related to at least one of the following: a capability of the terminal, a SCS, a preferred offset reported by the terminal, or a BWP switch delay.

In some embodiments, an end moment of the switching operation is before or at a start moment of the on duration of the DRX cycle.

In some embodiments, the first cell is any one of the following: all serving cells of the terminal or any one or more serving cells of the terminal.

In some embodiments, when the computer program is executed by the processor 901, the following steps may be further implemented:

sending third indication information to the terminal by using the transceiver 904, where the third indication information is used to indicate the target power saving mode.

In some embodiments, the target power saving mode is determined by using at least one of the following parameters:

a target BWP, the number of transmit antennas or transmit channels, the number of receive antennas or receive channels, a maximum number of downlink MIMO layers, a maximum number of uplink MIMO layers, a CORESET, a search space group, search space, a bandwidth size of a BWP, uplink component carriers with same active time, downlink component carriers with same active time, a time interval between a PDCCH and a PDSCH scheduled by the PDCCH, a time interval between a PDSCH and a HARQ-ACK, a time interval between a PDCCH and a PUSCH scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, the number of CSI simultaneously processed by the terminal, the number of beam management reports simultaneously processed by the terminal, the number of measurement resources simultaneously received or processed by the terminal, a delay related to a CSI report, and a delay related to a beam management report.

In some embodiments, the target BWP is any one of the following: a dormant BWP, a default BWP, a first non-dormant BWP, a first active BWP, or a BWP configured by the terminal.

In some embodiments, when the computer program is executed by the processor 901, the following steps may be further implemented:

receiving, by using the transceiver 904, fourth indication information sent by the terminal, where the fourth indication information is used to indicate whether the terminal has a capability of performing the switching operation; and send the first indication information to the terminal by using the transceiver 904 in a case that the fourth indication information indicates that the terminal has the capability of performing the switching operation.

In some embodiments, the terminal is not configured with first DCI, the first DCI is scrambled by using a PS-RNTI, and a format of the first DCI is a DCI format 2_6.

In some embodiments, when the computer program is executed by the processor 901, the following steps may be further implemented:

sending configuration information to the terminal by using the transceiver 904, where the configuration information indicates whether the terminal performs the switching operation at the first moment before the on duration of the DRX cycle.

The network side device 900 can implement processes implemented by the network side device in the foregoing method embodiments. To avoid repetition, details are not described herein again.

In FIG. 9, a bus architecture may include any number of interconnected buses and bridges, and is linked by various circuits of one or more processors represented by the processor 901 and a memory represented by the memory 902. The bus architecture may further link various other circuits such as a peripheral device, a voltage regulator, and a power management circuit together. These are all well-known in the art, and therefore are not further described in this specification. The bus interface provides interfaces. The transceiver 904 may be multiple elements, in other words, includes a transmitter and a receiver, and provides a unit configured to communicate with various other apparatuses on a transmission medium. For different user equipment, the user interface 903 may further be an interface that can be externally or internally connected to a required device. The connected device includes but is not limited to a keypad, a display, a loudspeaker, a microphone, a joystick, and the like.

The processor 901 is responsible for managing the bus architecture and common processing, and the memory 902 may store data used when the processor 2601 performs an operation.

An embodiment of the present disclosure further provides a computer-readable storage medium. The computer-readable storage medium stores a program or an instruction. When the program or the instruction is executed by a processor, processes in the embodiments of the power saving mode switching method applied to the terminal or the network side device are implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, in the specification and claims, "and/or" is used to indicate at least one of connected objects, for example, A and/or B and/or C indicates seven cases: only A, only B, only C, both A and B, both B and C, both A and C, and A, B and C. Similarly, "at least one of A and B" used in this specification and claims should be understood as "only A, only B, or both A and B".

It should be noted that division of the modules of the foregoing device is merely logical function division. In actual implementation, all or some of the units may be integrated into a same physical entity, or may be physically separated. In addition, all these modules may be implemented in a form of software by invoking a processing element; or all these modules may be implemented in a form of hardware; or some modules may be implemented in a form of software by invoking a processing element, and some modules are implemented in a form of hardware. For example, the determining module may be a separately disposed processing element, or may be integrated into a chip of the foregoing apparatus for implementation. In addition, the determining module may be stored in a memory of the foregoing apparatus in a form of program code, and a processing element of the foregoing apparatus invokes and executes a function of the determining module. Implementation of other modules is similar to this. In addition, all or some of these modules may be integrated together or implemented independently. The processing element described herein may be an integrated circuit with a signal processing capability. In an implementation process, the steps in the foregoing methods or the modules may be completed by using an integrated logic circuit of hardware in the processor element or an instruction in a form of software.

For example, the modules, units, sub-units, or sub-modules may be one or more integrated circuits configured to implement the foregoing methods, for example, one or more Application Specific Integrated Circuit (ASIC), one or more microprocessors (Digital Signal Processor (DSP)), or one or more Field Programmable Gate Array (FPGA). For another example, when a specific module is implemented in a form of a processing element by invoking a program, the processing element may be a general purpose processor, such as a Central Processing Unit (CPU) or another processor that can invoke program code. For another example, these modules may be integrated and implemented in a form of a System-On-a-Chip (SOC).

According to the descriptions of the foregoing implementations, a person skilled in the art may understand that the foregoing method embodiments may be implemented by using software and a required universal hardware platform, or may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A power saving mode switching method, performed by a terminal, wherein the method comprises:
   performing a switching operation at a first moment before on duration of a Discontinuous Reception (DRX) cycle, wherein the switching operation is used to switch a first cell of the terminal to a target power saving mode,
   wherein when active time of a previous DRX cycle followed by the DRX cycle is greater than on duration of the previous DRX, performing the switching operation comprises:
      when the first moment is located before the on duration of the DRX cycle and after the active time of the previous DRX cycle, performing the switching operation at the first moment; and
      when the first moment is located before the on duration of the DRX cycle but is within the active time of the previous DRX cycle, determining not to perform the switching operation at the first moment.

2. The method according to claim 1, wherein the performing the switching operation at the first moment before the on duration of the DRX cycle comprises:
   performing the switching operation at the first moment before the on duration of each DRX cycle.

3. The method according to claim 1, wherein a first offset of the first moment relative to a start moment of the on duration of the DRX cycle is configured by a network side device or agreed upon in a protocol.

4. The method according to claim 3, wherein the first offset of the first moment when the switching operation is performed is related to at least one of the following: a capability of the terminal, a SubCarrier Spacing (SCS), a preferred offset reported by the terminal, or a BandWidth Part (BWP) switch delay.

5. The method according to claim 1, wherein an end moment of the switching operation is before or at a start moment of the on duration of the DRX cycle.

6. The method according to claim 1, wherein the target power saving mode is configured by a network side device or agreed upon in a protocol; and
   wherein the target power saving mode is determined by using at least one of the following parameters:
      a target BandWidth Part (BWP), a number of transmit antennas or transmit channels, a number of receive antennas or receive channels, a maximum number of downlink Multiple-Input Multiple-Output (MIMO) layers, a maximum number of uplink MIMO layers, a COntrol REsource SET (CORESET), a search space group, search space, a bandwidth size of a BWP, uplink component carriers with same active time, downlink component carriers with same active time, a time interval between a Physical Downlink Control CHannel (PDCCH) and a Physical Downlink Shared CHannel (PDSCH) scheduled by the PDCCH, a time interval between a PDSCH and a Hybrid Automatic Repeat reQuest-ACKnowledgement (HARQ-ACK), a time interval between a PDCCH and a Physical Uplink Shared CHannel (PUSCH) scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, a number of Channel State Information (CSI) simultaneously processed by the terminal, a number of beam management reports simultaneously processed by the terminal, a number of measurement resources simultaneously received or processed by the terminal, a delay related to a CSI report, or a delay related to a beam management report.

7. The method according to claim 6, wherein the target BWP is any one of the following: a dormant BWP, a default BWP, a first non-dormant BWP, a first active BWP, or a BWP configured by the terminal.

8. The method according to claim 1, wherein the performing the switching operation at the first moment before the on duration of the DRX cycle comprises:
   when the terminal has a capability of performing the switching operation, performing the switching operation at the first moment before the on duration of the DRX cycle.

9. The method according to claim 1, wherein the terminal is not configured with first Downlink Control Information (DCI), the first DCI is scrambled by using a Power Saving Radio Network Temporary Identifier (PS-RNTI), and a format of the first DCI is a DCI format 2_6.

10. The method according to claim 1, wherein before the performing the switching operation at the first moment before the on duration of the DRX cycle, the method further comprises:

receiving configuration information, wherein the configuration information indicates whether the terminal performs the switching operation at the first moment before the on duration of the DRX cycle.

11. A power saving mode switching method, performed by a network side device, wherein the method comprises:
sending first indication information to a terminal, wherein the first indication information is used to instruct the terminal to perform a switching operation at a first moment before on duration of a Discontinuous Reception (DRX) cycle, and the switching operation is used to switch a first cell of the terminal to a target power saving mode,
wherein when active time of a previous DRX cycle followed by the DRX cycle is greater than on duration of the previous DRX, the switching operation is performed at least by:
when the first moment is located before the on duration of the DRX cycle and after the active time of the previous DRX cycle, performing the switching operation at the first moment; and
when the first moment is located before the on duration of the DRX cycle but is within the active time of the previous DRX cycle, determining not to perform the switching operation at the first moment.

12. The method according to claim 11, wherein the first indication information is used to instruct the terminal to perform the switching operation at the first moment before the on duration of each DRX cycle.

13. The method according to claim 11, wherein before the sending the first indication information to the terminal, the method further comprises:
sending second indication information to the terminal, wherein the second indication information is used to indicate a first offset of the first moment relative to a start moment of the on duration of the DRX cycle; and
wherein the first offset of the first moment when the switching operation is performed is related to at least one of the following: a capability of the terminal, a SubCarrier Spacing (SCS), a preferred offset reported by the terminal, or a BandWidth Part (BWP) switch delay.

14. The method according to claim 11, wherein before the sending the first indication information to the terminal, the method further comprises:
sending third indication information to the terminal, wherein the third indication information is used to indicate the target power saving mode;
wherein the target power saving mode is determined by using at least one of the following parameters:
a target BandWidth Part (BWP), a number of transmit antennas or transmit channels, a number of receive antennas or receive channels, a maximum number of downlink Multiple-Input Multiple-Output (MIMO) layers, a maximum number of uplink MIMO layers, a COntrol REsource SET (CORESET), a search space group, search space, a bandwidth size of a BWP, uplink component carriers with same active time, downlink component carriers with same active time, a time interval between a Physical Downlink Control CHannel (PDCCH) and a Physical Downlink Shared CHannel (PDSCH) scheduled by the PDCCH, a time interval between a PDSCH and a Hybrid Automatic Repeat reQuest-ACKnowledgement (HARQ-ACK), a time interval between a PDCCH and a Physical Uplink Shared CHannel (PUSCH) scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, a number of Channel State Information (CSI) simultaneously processed by the terminal, a number of beam management reports simultaneously processed by the terminal, a number of measurement resources simultaneously received or processed by the terminal, a delay related to a CSI report, or a delay related to a beam management report.

15. The method according to claim 11, wherein before the sending the first indication information to the terminal, the method further comprises:
receiving fourth indication information sent by the terminal, wherein the fourth indication information is used to indicate whether the terminal has a capability of performing the switching operation; and
the sending the first indication information to the terminal comprises:
sending the first indication information to the terminal when the fourth indication information indicates that the terminal has the capability of performing the switching operation.

16. The method according to claim 11, wherein before the sending the first indication information to the terminal, the method further comprises:
sending configuration information to the terminal, wherein the configuration information indicates whether the terminal performs the switching operation at the first moment before the on duration of the DRX cycle.

17. A terminal, comprising:
a memory storing computer-readable instructions;
a processor coupled to the memory and configured to execute the computer-readable instructions, wherein the computer-readable instructions, when executed by the processor, cause the processor to perform operations comprising:
performing a switching operation at a first moment before on duration of a Discontinuous Reception (DRX) cycle, wherein the switching operation is used to switch a first cell of the terminal to a target power saving mode,
wherein when active time of a previous DRX cycle followed by the DRX cycle is greater than on duration of the previous DRX, performing the switching operation comprises:
when the first moment is located before the on duration of the DRX cycle and after the active time of the previous DRX cycle, performing the switching operation at the first moment; and
when the first moment is located before the on duration of the DRX cycle but is within the active time of the previous DRX cycle, determining not to perform the switching operation at the first moment.

18. The terminal according to claim 17, wherein the target power saving mode is configured by a network side device or agreed upon in a protocol;
wherein the target power saving mode is determined by using at least one of the following parameters:
a target BandWidth Part (BWP), a number of transmit antennas or transmit channels, a number of receive antennas or receive channels, a maximum number of downlink Multiple-Input Multiple-Output (MIMO) layers, a maximum number of uplink MIMO layers, a COntrol REsource SET (CORESET), a search space group, search space, a bandwidth size of a BWP, uplink component carriers with same active time, downlink component carriers with same active time, a time interval between a Physical Downlink Control CHannel (PDCCH) and a Physical Downlink Shared CHannel (PDSCH) scheduled by the PDCCH, a time interval between a PDSCH and a Hybrid Automatic Repeat reQuest-ACKnowledgement (HARQ-ACK), a time interval between a PDCCH and a Physical Uplink Shared CHannel (PUSCH) scheduled by the PDCCH, a PDSCH processing delay, a PUSCH preparation delay, a PDCCH monitoring cycle, a PDCCH monitoring offset, PDCCH monitoring duration, a maximum uplink transmission rate, a maximum downlink transmission rate, a number of Channel State Information (CSI) simultaneously processed by the terminal, a number of beam management reports simultaneously processed by the terminal, a number of measurement resources simultaneously received or processed by the terminal, a delay related to a CSI report, or a delay related to a beam management report.

19. The terminal according to claim 17, wherein a first offset of the first moment relative to a start moment of the on duration of the DRX cycle is configured by a network side device or agreed upon in a protocol.

20. The terminal according to claim 19, wherein the first offset of the first moment when the switching operation is performed is related to at least one of the following: a capability of the terminal, a SubCarrier Spacing (SCS), a preferred offset reported by the terminal, or a BandWidth Part (BWP) switch delay.

* * * * *